June 26, 1956 — R. C. HOFFMAN — 2,752,178
CUSHIONED UNIVERSAL BEARING STRUCTURE
Original Filed April 22, 1949 — 3 Sheets-Sheet 1

INVENTOR.
Roscoe C. Hoffman.
BY
Harness, Dickey & Pierce.
ATTORNEYS.

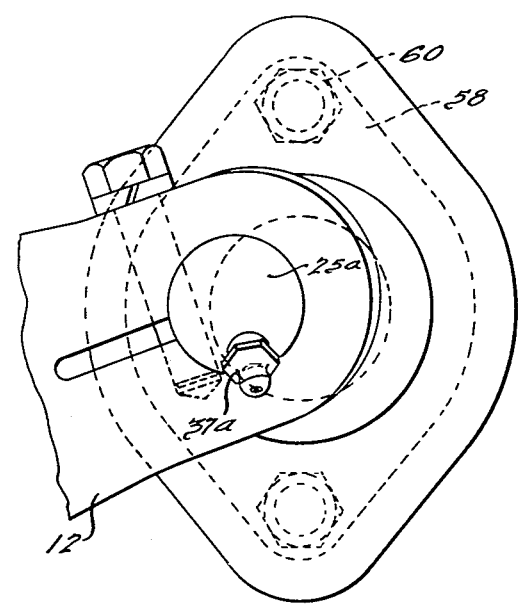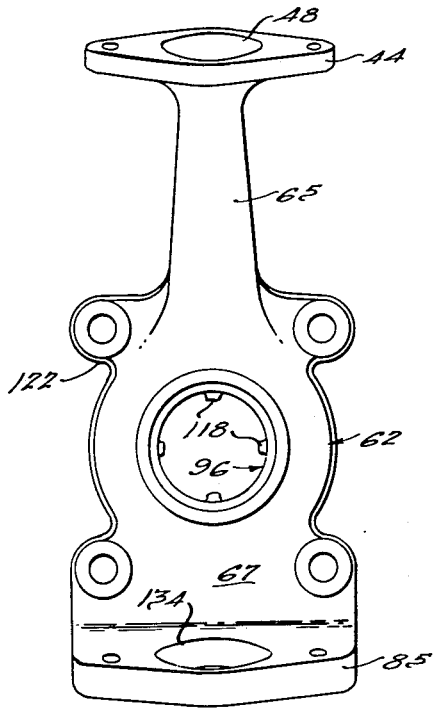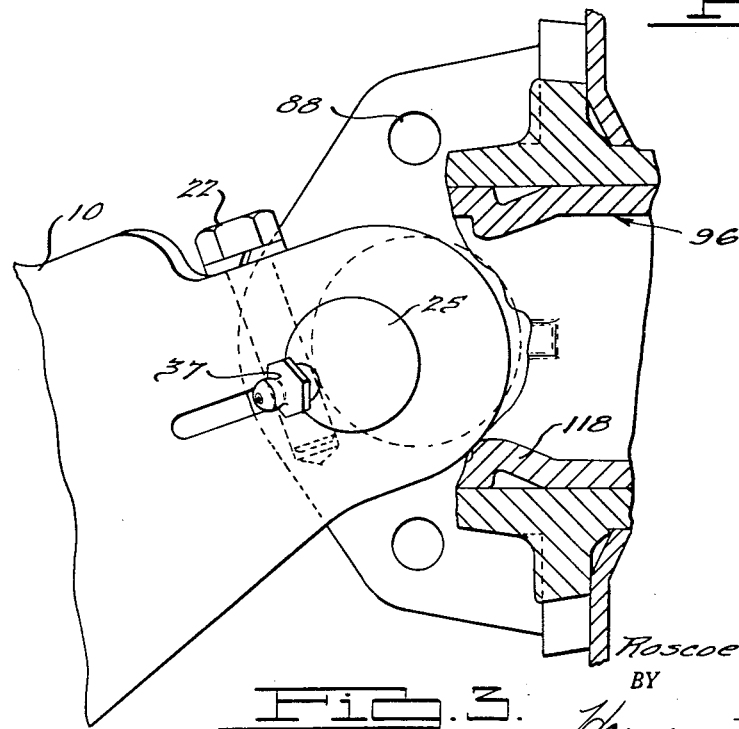

June 26, 1956 R. C. HOFFMAN 2,752,178
CUSHIONED UNIVERSAL BEARING STRUCTURE
Original Filed April 22, 1949 3 Sheets-Sheet 3
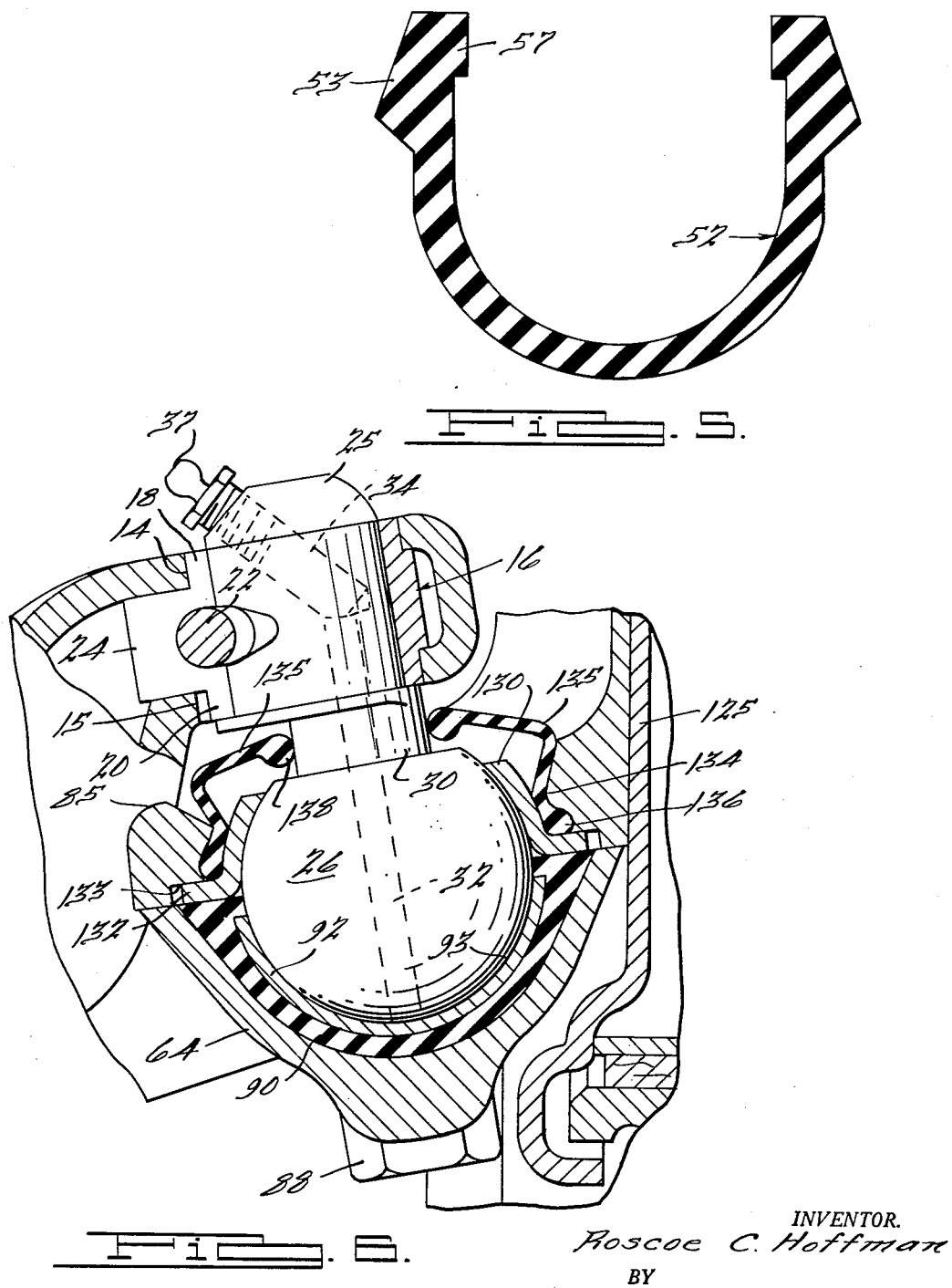
INVENTOR.
Roscoe C. Hoffman
BY
Harness, Dickey & Pierce
ATTORNEYS

United States Patent Office 2,752,178
Patented June 26, 1956

2,752,178

CUSHIONED UNIVERSAL BEARING STRUCTURE

Roscoe C. Hoffman, Detroit, Mich.

Original application April 22, 1949, Serial No. 89,125. Divided and this application January 15, 1952, Serial No. 266,501

10 Claims. (Cl. 287—90)

This application is a division of my copending application, Serial No. 89,125, filed April 22, 1949, Patent No. 2,631,865.

The present invention relates to ball-type universal joints.

An important object of the invention is to provide an improved ball joint structure having novel pre-stressed internal elastic cushioning means which takes up all clearance between the parts, the parts being arranged in such manner that in event of failure or deterioration of the rubber, the parts of the ball joint remain rigidly held and interlocked against unwanted separation.

Another object is to provide in such a cushioned ball joint improved means for mechanically securing the ball and socket parts together while permitting relative floating movement therebetween in such manner as to allow shifting of the parts in event they are subjected to severe shocks while safeguarding the rubber or other elastic cushioning material against harmful pinching or other localized stresses of a magnitude such that injury might result.

Still another object is to provide in conjunction with such improved ball and socket-joint an improved dust shield structure for preventing foreign matter from entering the joint formed by the ball and socket parts.

In the drawings:

Fig. 2 is an elevational view of the steering knuckle support removed from the remainder of the mechanism, taken substantially as indicated by the line and arrows 2—2 of Fig. 1;

Figure 1:
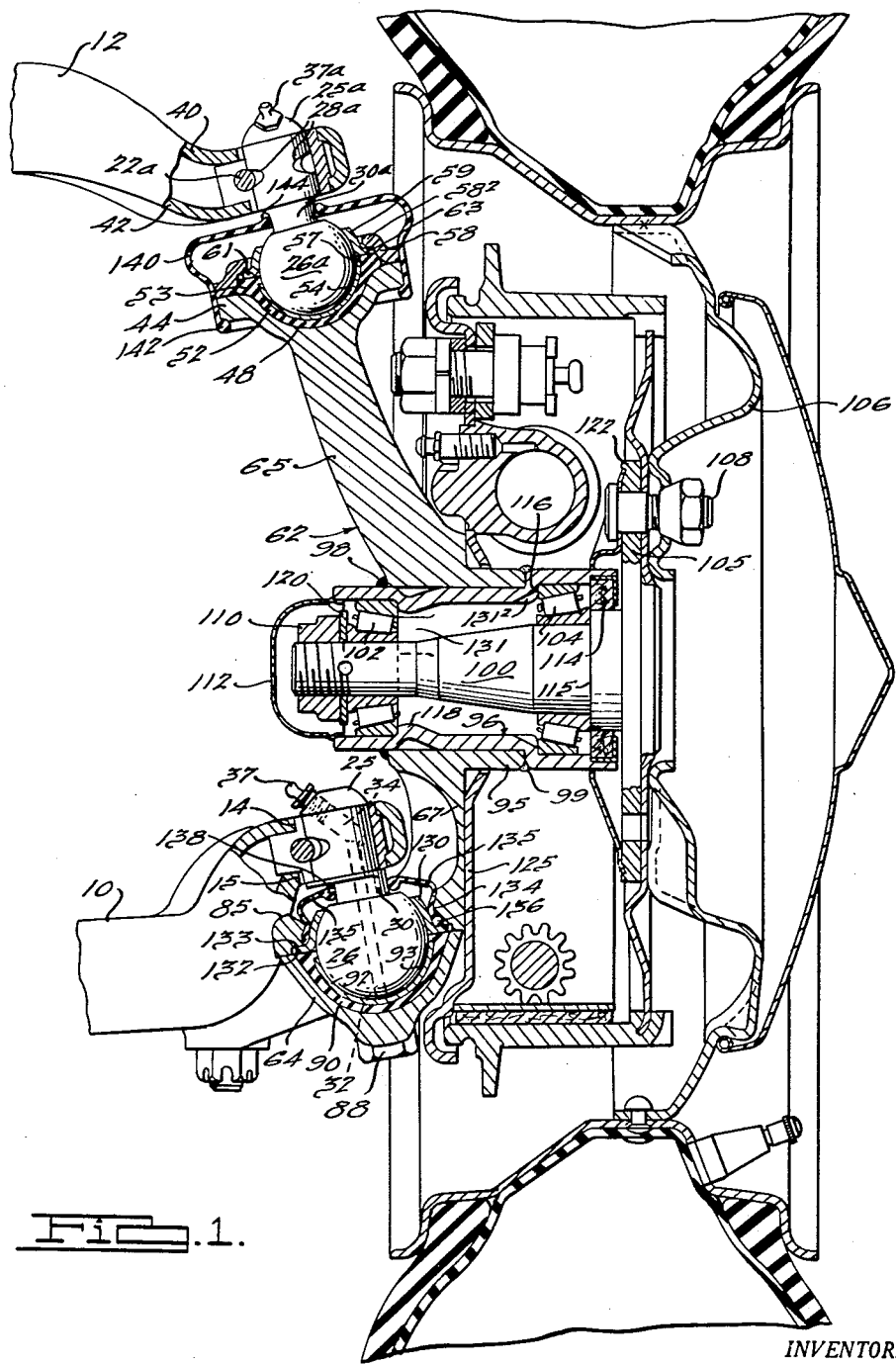
Figure 1 is a view principally in diametric vertical section, but with parts in elevation, showing a wheel supporting structure incorporating ball and socket joints constructed in accordance with the present invention, and illustrating adjacent portions of the supported wheel and brake mechanism.

Figs. 3 and 4 are sectional plan views taken substantially on the lines 3—3 and 4—4, respectively, of Fig. 1 and looking in the direction of the arrows;

Fig. 5 is a cross-sectional view of a resilient cushioning liner, and

Fig. 6 is an enlarged cross section of the lower ball joint.

Referring now to the drawings, reference character 10 designates the lower control arm of an independent wheel suspension system which is illustrated as of the so-called wishbone-type. Reference character 12 represents the upper control arm of the suspension system. These parts are shown only fragmentarily since the details of their construction and the mode of mounting and positioning of the arms form no part of my present invention and may be varied without departing from the invention. Suitable mechanisms of this character are familiar to those skilled in the art. As indicated, each control arm may include spaced upper and lower web portions. In the case of the lower control arm, aligned openings 14, 15 of like size are formed in the upper and lower webs, respectively, to constitute in effect a single orifice which serves to locate a substantially circular split clamping block 16, having reduced circular upper and lower end portions as 18, 20 fitted in the openings 14, 15, respectively, and intermediate portions of greater diameter than such openings, as shown, so that the clamping block is trapped in position. A clamping bolt 22 extends transversely through the split end 24 of the block and, when tightened, firmly holds in position the substantially cylindrical hub portion 25 of the lower bearing ball 26, which may be formed integrally with the hub portion 25. The hub portion 25 is provided with a round-bottomed peripheral groove 28 through which the clamping bolt 22 extends so that the bolt serves as a key to positively lock the hub 25 against axial displacement. The groove 28 may be less than 360° in extent, to confine the angular adjusting movement of the hub within desired limits.

The ball 26 is positioned eccentrically with respect to the hub, being joined to the hub 25 by an integral stem portion 30. A drilled hole 32 for lubricant extends through the hub portion 25, stem 30 and ball 26, from the top of the hub portion 25, which is exposed above the control arm 10. The hole terminates at a lower portion of the surface of the ball remote from the stem. A portion 34 of the upper extremity of the lubricant passage 32 extends at an angle to the axis of the hub, and at its outer end such inclined portion is tapped to receive a lubricant fitting 37. When the lubricant fitting is removed, any suitable tool such as a simple rod may be inserted in the inclined passage portion 34, and it will be understood that when the clamping bolt 22 is loosened, the eccentrically positioned ball may be adjusted by rotating the same about the geometric axis of the hub 25, simply by turning the hub with the aid of the rod.

The upper control arm may also, like the lower arm, include spaced but rigidly connected upper and lower web portions, such web portions of the upper arm being respectively designated 40, 42. The upper control arm 12 carries a ball 26a which may be supported in the arm by supporting means substantially corresponding to the supporting means for the lower ball 26. The portions of the upper ball and supporting means corresponding to those of the lower ball and supporting means are designated by like reference characters distinguished by the addition of the letter a to each, and will require no detailed redescription. It will be observed, however, that the peripheral slot 28a in the hub portion 25a which carries the upper ball is of greater angular length, the slot 28a being so located that when the upper ball 26a is approximately in the mid portion with respect to its range of angular adjustment, a plane extending through the center of the ball and the axis of the hub portion 25a extends longitudinally of the car, so that rotation of the ball and hub through a limited arc about the axis of the hub moves the ball primarily in a direction transverse with respect to the car to effect caster adjustment. On the other hand, the slot 28 in the lower ball hub 25 is so located that with the lower ball in its medial position of adjustment, a plane projected through the center of the ball and the axis of the hub extends transversely of the vehicle, so that the angular adjustment of the ball and hub in either direction from such medial position primarily effects movement of the ball toward the front or rear, thereby having its principal effect in the adjustment of the caster angle.

A wheel-carrying knuckle support member 62 which may be forged of steel or otherwise suitably formed is provided with upwardly and downwardly extending arms 65, 67, respectively, which support socket portions in which the balls 26, 26a are received for swiveling movement. The upwardly extending arm 65 of the knuckle support is flared at its top to form the flange 44 and provided with a central recess 48 of spherical form. A preassembled bearing and cushioning structure is fitted in the recess 48 and comprises a cupped sheet metal bearing shell 54 lined with Babbitt or other suitable bearing alloy shaped to accurately receive the ball 26a and encircled by a cushioning cup 52 of soft rubber or the like. The cup 52 is approximately semi-spherical and is provided with a thickened rim portion 53 from which a flange 57 extends inwardly substantially radially. The relaxed diameter of the rim and flange portions 53, 57 is less than the diameter of the shell 54, and the cushioning cup is assembled upon the bearing shell by stretching the cushioning cup and its rim 53 and flange 57 so that the rim portion 53 encircles the bearing cup near the free edge of the latter, and the flange 57 extends inwardly across such free edge of the bearing cup. The tension then exerted by the thickened rim 53 and flange 57 is sufficient to hold the cushioning shell in place.

The flange 44 is elongated toward the front and rear, as best shown in Fig. 2, so that the cupped flange assembly is substantially diamond-shaped, viewed in plan. A retaining ring 58 of corresponding peripheral contour fits over the flange 44, to which it is secured by cap screws 60. A bearing liner ring 59 is interposed between the retaining ring 58 and the ball 26a, the interior surface of the ring constituting in effect a continuation of the bearing shell 54. Ring 59 has a base flange 61 projecting radially outwardly to lie beneath and be retained by the ring 58. It will be noted that the diameter of the base flange 61 is less than the internal diameter of the ring portion 58 into which the flange projects, so that a gap 63 is left extending entirely around the base flange 61, between such flange and the ring. The overhanging portion 58² of the ring 58, also, does not project inwardly to engagement with the exterior of the shell 59. A similar annular gap is thereby formed between shell 59 and clamping ring portion 58². By virtue of this arrangement, the entire knuckle supporting structure can shift laterally with respect to the ball 26a, against the resistance of the rubber cushioning liner 52, under shock loads. It will be appreciated that this increases the effectiveness of cushioning of the interengaged metallic ball joint parts and materially reduces the tendency of such parts to gall one another. When the screws 60 are tightened, the ring 58 draws the ring 59 downwardly against the ball, urging the ball into the bearing shell 54 and thereby compressing the rubber liner 52 between the shell 54 and socket 48. The flange 61 also serves to retain and compress the rubber liner. It will be understood that the minimum diameter of the ring 59 is less than the ball 26a, so that when the parts are assembled in the manner shown, the ball is securely retained.

The downwardly projecting arm 67 of the knuckle member is turned outwardly to form the apertured flange 85, and the lower ball 26 projects downwardly through the opening 134 in flange 85. The lower bearing socket portion for the bottom ball 26 comprises a sheet metal bearing shell 92 which may be faced internally with a suitable bearing metal of Babbitt or other appropriate alloy as indicated at 93. A cushioning liner 90 is similarly fitted over the bearing shell and corresponds to the previously described cushioning liner 52. The lower arm portion 85 may also be formed with lug defining forwardly and rearwardly extending portions in which cap screws as 88 are adapted to be threadedly fitted. The screws secure to the lower face of the arm portion 85 a supporting socket member 64 in which the bearing shell and cushioning liner elements 92, 90 are fitted. These parts are likewise so proportioned that when the screws 88 are tightened, the cushioning liner 90 is compressed and the bottom bearing shell section 92 is urged upwardly against the bottom of the ball to compress the ball between bearing shell portions 92, 130.

The lubricant passage (not shown) for the upper ball is also formed with an inclined upper end portion for the reception of a rod or other tool when its lubricant fitting 37a is removed. Also in corresponding fashion, the clamping bolt 22a may extend through a round-bottomed peripheral groove 28a in the hub 25a so that the clamping bolt locks the ball against displacement, although the groove permits rotation of the ball and its hub when the bolt is loosened.

The socket bearing portion carried by the lower outturned arm portion 85 of the steering knuckle element 62 may include a separate annular shell 130 shaped to conform to the ball and having a base flange 132 retained in a counterbored portion 133 formed in the bottom of the arm 85. The opening 134 in the arm portion 85 is substantially larger than the external diameter of the shell. An annular space is thereby defined between the shell and arm which is so proportioned as to receive the lower margin of a flexible protective sleeve 135. The sleeve may be formed of synthetic rubber or the like and is provided with an enlarged bottom bead or rim portion 136 which is retained in the annular opening referred to, such opening being somewhat enlarged at its lower portion directly above the flange 132 to receive and retain the bead 136. The lower portion of the protective sleeve 135 is also compressed between the bearing ring 130 and the arm 85, so that the sleeve is tightly gripped and effectively sealed at its lower end. At its upper end, the sleeve is provided with a thickened bead portion 138, the relaxed diameter of which is less than the relaxed diameter of the stem portion 30 against which it bears when the sleeve is installed in the manner shown in Fig. 1. The sleeve is sufficiently resilient so that the portion 138 may be stretched to pass over the hub 25 or over the ball 26 during installation of the sleeve. It will be observed that the counterbored portion 133 is also of greater diameter than the base flange 132 of bearing shell portion 130, so that lateral movement of the parts carried by the knuckle structure can occur with respect to the ball and bearing shell portions against the resistance of the precompressed rubber cushioning liner 90. The action of these parts is analogous to those of the upper joint portions previously described. Thus although the parts of both joints are positively mechanically interlocked by metallic holding portions, they are so cushioned that the ball and socket portions cannot be hammered with respect to one another. The life of the ball and socket parts is thereby substantially increased and such parts will remain in effective engagement with one another, without clearance, for a very long period of time.

An upper protective lubricant retaining sleeve 140 is also provided. As shown in the drawing, the lower end of the upper sleeve may be provided with a conventional thickened rim portion 142 adapted to encircle and bear tightly inwardly against the socket backing and supporting portion 44 formed at the upper end of the knuckle arm 65. The upper end of the sleeve 140 is formed with a similar stretched rim or bead portion 144 which embraces the stem 30a.

The knuckle support member 62 is provided with a cylindrical hub flange portion 95 adapted to carry the wheel bearing supporting knuckle sleeve 96, which may be welded to the opposite ends of the knuckle hub flange 95, as indicated at 98, 99.

A stub axle 100 is journaled in the knuckle sleeve 96 as in suitable antifriction bearings 102, 104. At its outer end, the stub axle 100 may be hot upset or otherwise provided with a head adapted to form an integral flange 105 defining a wheel supporting hub to which a disk wheel 106 may be secured as by the screw means 108.

The inner end of the knuckle tube 96 is open inside knuckle support member 62 and the stub axle 100 is tapered to reduced diameter and projects inwardly to an accessible position inside knuckle member 62, where it is threaded for reception of the bearing nut 110. A grease cap 112 is fitted in the end of the knuckle tube 96 to enclose the inner end of the structure, the outer end of which is sealed by a suitable grease retainer as 114 carried by the knuckle tube and bearing against a peripheral portion of the stub axle. A shoulder 115 serves as an abutment for the cone of the outer wheel bearing assembly 104. The cup of this bearing assembly 104 is located by an integral shoulder 116 rolled or otherwise suitably formed in the knuckle tube 96. The cup portion of the inner bearing assembly 102 is located by a plurality of lug-defining shoulders as 118, pressed inwardly and partly sheared from the wall of the tube 96, the cone of the bearing 102 being retained by a washer 120 beneath the nut 110.

The knuckle support member 62 may be provided with conventional integral pierced lug portions 122 through which bolts (not shown) may extend to carry the brake support and backing plate 125 and the steering arm 124.

It will be appreciated that the parts may be so proportioned and initially adjusted that the wheel is approximately at the proper caster angle when the ball 26 is near the outer limit of its adjustment, as shown in the drawings, and that relatively slight rotary movement of the hub 25 moves the ball toward the front or rear of the vehicle to a greater extent than the ball 26 is moved inwardly or outwardly toward the center line of the car. The normal intended range of adjustment of the ball is less than 90°, so that the principal adjustment effected by moving the ball 26 through such range is one of caster, although the camber angle is of course also affected to a slight degree. The parts are also so proportioned that the camber angle of the wheel is in the neighborhood of the desired value when the upper ball 26a is near the front or rear limit of its range of adjustment, and the normal range of adjustment is less than 90° so that adjustment of the position of the upper ball affects principally the camber angle. It will be understood that any undesired camber adjusting effect of the movement of the lower ball may be counteracted by readjusting the upper ball and, conversely, the caster effect resulting from adjustment of the upper ball can be counteracted by readjustment of the lower ball.

The relaxed configuration of the resilient cushioning liners may be substantially as shown in Figure 5, and it will be appreciated that the liner may be stretched over the ball, in each case, and then compressed when the parts are drawn together by the screws 60 or 88.

As wheel suspensions of the type under consideration are commonly constructed, the lower control arm carries substantially the entire load and transmits it to the chassis frame through a coil compression spring (not shown). The lower ball and socket portions may accordingly be of greater diameter than the upper ball and socket portions which are only required to carry a relatively small proportion of the weight of the vehicle resulting from the resolution of forces.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A ball and socket joint structure comprising a ball, a rigid backing element having a socket portion therein, said socket portion being substantially larger in inside diameter than the ball, a relatively thin and hemispherical bearing shell engaging the ball and having a free edge lying substantially in one plane, said ball being substantially smaller than the socket, a resilient cushioning liner between said backing element and shell and circumferentially stretched over the shell, and flange means mechanically interlocking the cushioning liner with respect to the free edge of the shell and maintaining the same in stretched condition independently of compressive force exerted thereupon by the backing element and shell, the radial spacing between the backing element and shell being less than the thickness of said liner when the liner is stretched, whereby the cushioning liner is compressed substantially radially between the shell and backing element.

2. Means as defined in claim 1 wherein said resilient liner is preformed substantially to the shape of, but somewhat smaller than, the shell, and marginal flange portions integral with said liner and projecting radially both inwardly and outwardly therefrom and offering greater resistance to stretching than other portions of said liner, one of said flange portions overlying a rim of said shell when the liner is stretched thereover and another of said flange portions being interengaged with the backing element.

3. Means as set forth in claim 1 wherein said socket and shell are of partly spherical form, the liner being preformed of elastic material and having a thickened rim portion more resistant to stretching than other portions of the liner and adapted to overlie an outer marginal portion of the shell when stretched thereover, said bearing shell being no greater than 180° in angular extent, a complemental generally annular bearing shell adapted to coact with the first-mentioned bearing shell, said thickened rim portion projecting inwardly between said shell and said complemental shell, and clamping means for urging said first-mentioned bearing shell and said complemental bearing shell toward one another and against opposed portions of the ball.

4. In a structure as defined in claim 1, clamping means reacting against an opposed portion of the ball to urge the ball into the shell and the shell against the cushioning liner to compress the latter, a complemental shell portion between the clamping means and ball and bearing against the ball, said complemental shell portion having a flange projecting outwardly between said clamping portion and backing element, said liner projecting inwardly between said first-mentioned shell and said complemental shell, and lubricant retaining means including a sleeve substantially sealed at one end with respect to the ball and held at its other end between said clamping means and flange.

5. A ball and socket joint structure comprising a ball, a rigid backing element having a socket portion therein, said socket portion being substantially larger in inside diameter than the ball, a relatively thin bearing shell fitted upon the ball but substantially smaller than the socket, said bearing shell being partly spherical and having an edge lying substantially in one plane, a resilient cushioning liner interposed between the shell and socket, a substantially annular partly spherical complemental bearing shell ring fitted against an opposed portion of said ball, said shell ring having an edge lying in a plane substantially parallel to and relatively close to but spaced from said first-mentioned plane, a substantially radial flange portion carried by said complemental shell ring at its edge nearest the first-mentioned shell, said cushioning liner having an inwardly projecting portion extending between said edges of the first-mentioned shell and said complemental shell ring, and a clamping portion secured to said backing element and overlying and extending downwardly around, and bearing against, said flange, said clamping portion and flange being formed with substantial clearance in a radial direction to permit lateral shifting of one with respect to the other in a direction substantially parallel to the plane of the flange while opposing relative movement in a direction perpendicular to such plane.

6. A ball and socket joint structure comprising a ball, a rigid backing element having a socket portion therein, said socket portion being substantially larger in inside diameter than the ball, a relatively thin bearing shell fitted upon the ball but substantially smaller than the socket, said bearing shell being partly spherical and having an edge lying substantially in one plane, a resilient cushioning liner interposed between the shell and socket, a substantially annular partly spherical complemental bearing shell ring fitted against an opposed portion of said ball, said shell ring having an edge lying in a plane substantially parallel to and relatively close to but spaced from said first-mentioned plane, a substantially radial flange portion carried by said complemental shell ring at its edge nearest the first-mentioned shell, said cushioning liner having an inwardly projecting portion extending between said edges of the first-mentioned shell and said complemental shell ring, and a clamping portion secured to said backing element and overlying and extending downwardly around, and bearing against, said flange, the portion of said cushioning liner which is overlaid by said flange being of greater diameter than said flange, said clamping portion overlying the opposite face of the flange and simultaneously forcing the complemental shell against the ball and the flange against said portion of the liner.

7. A ball and socket joint structure comprising a ball, a rigid backing element having a socket portion therein, said socket portion being substantially larger in inside diameter than the ball, a relatively thin bearing shell fitted upon the ball but substantially smaller than the socket, said bearing shell being partly spherical and having an edge lying substantially in one plane, a resilient cushioning liner interposed between the shell and socket, a substantially annular partly spherical complemental bearing shell ring fitted against an opposed portion of said ball, said shell ring having an edge lying in a plane substantially parallel to and relatively close to but spaced from said first-mentioned plane, a substantially radial flange portion carried by said complemental shell ring at its edge nearest the first-mentioned shell, said cushioning liner having an inwardly projecting portion extending between said edges of the first-mentioned shell and said complemental shell ring, and a clamping portion secured to said backing element and overlying and extending downwardly around, and bearing against, said flange, the portion of said cushioning liner which is overlaid by said flange being of greater diameter than said flange, said clamping ring overlying the opposite face of the flange, and means for moving the clamping ring toward the backing element to urge the complemental shell against the ball and the flange against said portion of the cushioning liner, and to urge the ball and said first-mentioned shell into the socket and against the cushioning liner.

8. A ball and socket joint structure comprising a ball, a rigid backing element having a socket portion therein, said socket portion being substantially larger in inside diameter than the ball, a relatively thin bearing shell fitted upon the ball but substantially smaller than the socket, said bearing shell being partly spherical and having an edge lying substantially in one plane, a resilient cushioning liner interposed between the shell and socket, a substantially annular partly spherical complemental bearing shell ring fitted against an opposed portion of said ball, said shell ring having an edge lying in a plane substantially parallel to and relatively close to but spaced from said first mentioned plane, a substantially radial flange portion carried by said complemental shell ring at its edge nearest the first mentioned shell, said cushioning liner having an inwardly projecting portion extending between said edges of the first mentioned shell and said complemental shell ring, and a clamping portion secured to said backing element and overlying and extending downwardly around, and bearing against, said flange, said liner having a portion overengaged and compressed by said flange.

9. A ball and socket joint structure comprising a ball, a rigid backing element having a socket portion therein, said socket portion being substantially larger in inside diameter than the ball, a relatively thin bearing shell fitted upon the ball but substantially smaller than the socket, said bearing shell being partly spherical and having an edge lying substantially in one plane, a resilient cushioning liner interposed between the shell and socket, a substantially annular partly spherical complemental bearing shell ring fitted against an opposed portion of said ball, said shell ring having an edge lying in a plane substantially parallel to and relatively close to but spaced from said first mentioned plane, a substantially radial flange portion carried by said complemental shell ring at its edge nearest the first mentioned shell, said cushioning liner having an inwardly projecting portion extending between said edges of the first mentioned shell and said complemental shell ring, and a clamping portion secured to said backing element and overlying, and bearing against, said flange, the portion of said cushioning liner which is overlaid by said flange being of greater diameter than said flange, said clamping portion overlying the opposite face of the flange and simultaneously forcing the complemental shell against the ball and the flange against said portion of the liner, said flange lying in a plane substantially parallel to said previously mentioned planes of said edges, the periphery of said flange being free of and laterally movable with respect to said backing portion and said clamping portion.

10. A ball and socket joint structure comprising a ball, a rigid backing element having a socket portion therein, said socket portion being substantially larger in inside diameter than the ball, a relatively thin bearing shell fitted upon the ball but substantially smaller than the socket, said bearing shell being partly spherical and having an edge lying substantially in one plane, a resilient cushioning liner interposed between the shell and socket, a substantially annular partly spherical complemental bearing shell ring fitted against an opposed portion of said ball, said shell ring having an edge lying in a plane substantially parallel to and relatively close to but spaced from said first mentioned plane, a substantially radial flange portion carried by said complemental shell ring at its edge nearest the first mentioned shell, said cushioning liner having an inwardly projecting portion extending between said edges of the first mentioned shell and said complemental shell ring, a clamping portion secured to said backing element and overlying, and bearing against, said flange, the portion of said cushioning liner which is overlaid by said flange being of greater diameter than said flange, said clamping portion overlying the opposite face of the flange and simultaneously forcing the complemental shell against the ball and the flange against said portion of the liner, said flange lying in a plane substantially parallel to said previously mentioned planes of said edges, the periphery of said flange being free of and laterally movable with respect to said backing portion and said clamping portion, and cushioning means between said complemental shell ring and said clamping portion.

References Cited in the file of this patent

UNITED STATES PATENTS

| | | |
|---|---|---|
| 1,876,709 | Macpherson | Sept. 13, 1932 |
| 2,096,557 | Peo | Oct. 19, 1937 |
| 2,280,634 | Flumerfelt | Apr. 21, 1942 |
| 2,424,455 | Graham et al. | July 22, 1947 |
| 2,424,914 | Brown | July 29, 1947 |
| 2,537,629 | Brown | Jan. 9, 1952 |
| 2,589,820 | Konchan | Mar. 18, 1952 |